UNITED STATES PATENT OFFICE.

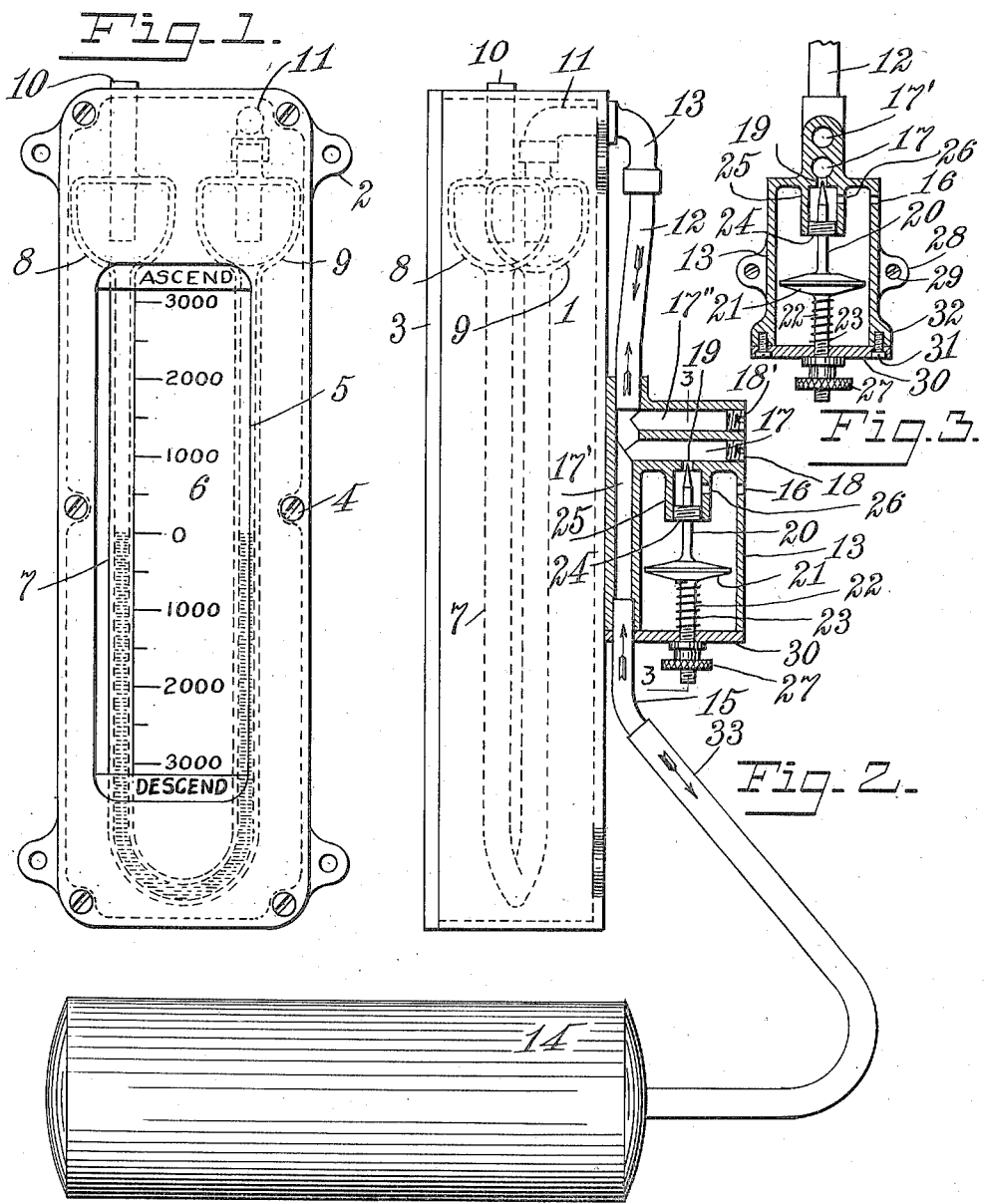

BENSON R. SHAW, OF DAYTON, OHIO.

CLIMB-INDICATOR FOR AIRCRAFTS.

1,308,557.   Specification of Letters Patent.   Patented July 1, 1919.

Application filed October 11, 1918.   Serial No. 257,733.

*To all whom it may concern:*

Be it known that I, BENSON R. SHAW, a citizen of the United States, residing at Dayton, in the county of Montgomery and State of Ohio, have invented certain new and useful Improvements in Climb-Indicators for Aircrafts, of which the following is a specification.

My invention relates to means for visually ascertaining the rate at which an aircraft is ascending and descending when in flight.

The object of the invention is to provide an accurate instrument of this character with means therein contained for compensating for the variations in the atmosphere, that is to say the difference in the pressure of the atmosphere due to the varying elevations of the aircraft so that the instrument will respond in indicating the rate of ascension or descension.

Referring to the accompanying drawings, Figure 1 is a front elevation of the instrument detached. Fig. 2 is a side elevation thereof, Fig. 3 is a detail view of the altitude control devices, and Fig. 4 is a top view of the same.

Essentially the instrument comprises a transparent U-tube partially filled with oil and trapped at both ends in order that should the instrument be placed in any other than a vertical position the traps will collect the oil. One end of said tube is open to the atmosphere and the other end is connected directly to a container to provide a sufficient volume of air for actuating the instrument. In the line from the U-tube to the container is arranged a regulator to compensate automatically for altitude and comprising a diaphragm actuated valve which coöperates with an escape vent as the higher altitudes are reached as will be more particularly described in the accompanying drawings in which similar reference characters will denote corresponding parts in the several views thereof.

In the said drawings 1 designates the back and side portions of a casing having apertured ears 2 projecting from the upper and lower portions of the back thereof by means of which the instrument is attached to any convenient point of the aircraft for observation. The part 1 so constituting the sides and back of an inclosing casing is preferably constructed of aluminum and to the front thereof, a plate 3 is secured having suitable openings for attaching it in position by screws 4. The said plate 3 has a sight opening 5 therein through which calibrations are visible which indicate the rate of the ascension or descension. The said indications are duplicated above and below a zero mark which is in the center of the indicator 6. At the top of said indicator the word "Ascend" is inscribed and at the bottom thereof the word "Descend" is similarly inscribed. The calibrations may be impressed or inscribed on a suitable body of material such as plaster of Paris or inscribed in any suitable way within the casing 1. Arranged within said casing is a U-shaped transparent tube 7 preferably of glass, the upper ends of which are provided with traps 8 and 9, the former being open to the atmosphere at 10. A portion of this glass U-shaped tube lies on the outside of the indicator 6 in proximity to the calibrations and the liquid therein registers with said calibrations according to the rate of ascending and descending attained by the air craft. The liquid within the tube is colored so that it contrasts with the background of the indictaor. The said tube is protected and held in position by having portions thereof inclosed in the material, to-wit, the body of plaster of Paris, upon which the indicator calibrations are shown. The traps 8 and 9 also hold the said U-tube firmly in position. A pipe 11 continues from the trap tube 9 and connects with one end of the U-tube, and also with a tube 12 which extends down on the rear of the instrument. The tubes 11 and 12 are both formed of copper and are united by an elbow 13. Tube 12 extends down at the back of the casing 1 and opens into a passage 17' at the back of the casing 13 secured to the rear of the casing 1. Through this tube 12 and the tube 11 air may pass to or from the U-tube and the atmospheric air container 14 with which a tube 15 communicates, and the level of the liquid in the U-tube is controlled thereby. The container 14 is secured in suitable proximity to the instrument, and a suitable connection between the tube 15 and container 14 is made by a flexible tube 33. Both tubes 12 and 15 communicate with the passage 17' at the back of the casing 13 and the several arrows show that the air may pass to and from the container 14 and the U-tube 7 through said tubes 12 and 15. The casing 13 is of cylindrical form and is secured to the rear of the casing 1 at approximately the position shown in Fig. 2. Around the upper portion of said casing 13 a series of vent openings 16 are arranged and at the top of the said casing a passage 17 is provided into which the air from the tubes 12 or 15 may enter as indicated by the arrows. The passage 17 is closed by a screw-plug 18, and the bottom thereof is provided with a small opening 19 that communicates with the interior of the casing 13 at the top. This opening 19 coöperates with a needle valve 20 which is connected with an altitude control diaphragm 21 which is on the inside of the casing 13. These elements constitute compensating means which tend to equalize or maintain a constant flow of air through the opening 19 when the aircraft is passing from one altitude to another. The pressure of air escaping from the container is relieved thereby at a rate over and above that which is necessary to force the liquid in the U-tube up to a given point when the aircraft is ascending. In descending the operation is reversed. This element 21 has a stem 22 projecting from it surrounded by a spring 23 which maintains the diaphragm and valve in normal position. The needle valve 20 extending from said diaphragm 21 passes through a screw-plug 24 which screws into an annular wall 25 which extends down from the top of the casing 13 on the interior thereof and provides a space into which the valve opening 19 communicates. The said annular wall 25 has vent openings 26 therein which form a communication between the surrounding space within the wall 25 and the interior of the upper portion of the casing 13 with which the vent openings 16 before referred to communicate. The lower end of the diaphragm stem 22 projects out of the bottom of the casing 13 and is fitted with an adjusting nut 27 which engages said stem and by means of which the position of the altitude control diaphragm 21 and the needle valve 20 are adjusted relative to the opening 19. When the proper adjustment is effected the adjusting nut 27 may be sealed. In the construction shown in the drawings the casing 13 in which the altitude control devices are placed is provided with apertured ears 28 by means of which it may be fastened to the rear of the casing 1 by screws 29. At the bottom of said casing a plate 30 is secured by screws 31 which enter said plate and penetrate ears 32 on opposite sides of the bottom of the casing 13. The altitude control diaphragm 21 is sensitive to the different specific gravities of the air and may be made of thin sheets of metal or laminations, united to the stem 22 on one side and to the needle valve 20 on the other side. The screw plug 24 forms a center guide for the needle valve, and the diaphragm 21 by expanding and contracting due to variations of altitude controls the volume of the air entering and discharging from the container 14 and U-tube 7 as the altitude of the aircraft changes. The air passes out through the valve opening 19 while the aircraft is ascending and passes in through said opening while said aircraft is descending. The relation between the readings on the scale and the rate of ascension and descension of the aircraft is direct. In other words, when ascending at a rate of 1000 feet per minute the liquid in the U-tube rises to the point so marked on the scale. It will be understood that the air passes through the valve opening 19 only when the aircraft is moving up or down. If the machine is brought to a level, that is to say, is neither ascending or descending the air ceases to pass through valve opening 19 because the atmosphere in the tank 14 has become equalized in pressure through the valve opening 19 with that of the outside air and the liquid in the U-tube returns to zero. If the climb is again started the air in tank 14, in endeavoring to equal the pressure of the outside air, which is diminishing during the time the machine is climbing, exerts a pressure on the liquid in the U-tube and allows an escapement through valve opening 19. Above the passage 17 a passage 17'' is provided which is closed by a screw-plug 18'. This passage communicates with the lower end of the air tube 12 and is designed to catch any oil that may pass into said tube from the U-tube in case the instrument, when detached, should be placed out of an upright position, thereby safeguarding the valve opening 19 from any oil that might enter the passage 17 and obstruct the opening were the passage 17'' not provided. It is apparent that the casing 13 with the several passages 17, 17' and 17'' may be in a single casting and structural as well as other changes might be made without departing from the principles of my invention. As an example, means may be provided for insulating the container 14 against temperature changes.

A brief desciption of the operation of the instrument is as follows: Assuming that the aircraft containing the instrument is ascending and the liquid in the U-tube indicates zero, as it is elevated the air is entering the U-tube from the container 14 through tube 15 and forces the liquid in the U-tube upwardly to the various calibrations indicated. As the aircraft continues its rate of climb the excess air entering the tube 15 relieves through valve opening 19 to an extent over and above that which is necessary to force up the liquid in the U-tube to the calibration corresponding with the rate at which the aircraft is ascending. In order to register the same rate as the rarified atmospheres are reached at higher altitudes the opening 19 is reduced in size by the raising of the needle 20 caused by the expanding diaphragm 21.

In descending the operation as described is reversed so that the rate of the descent is indicated. The needle valve allows the liquid in the U-tube to return to a zero position, (registering neither climb nor descent) when a level flight is started at any altitude.

Having described my invention I claim:

1. In a rate ascension and descension indicator for aircrafts, the combination with a calibrated scale, a transparent liquid-containing tube coöperating therewith in indicating the rate at which the aircraft is ascending or descending, said tube being open to atmospheric pressure, an atmospheric air container, a passage between said container and said tube, and an altitude control device through which regulated air pressure passes from the container to the atmosphere and from the atmosphere to the container, whereby the rise and fall of the liquid in said tube is controlled in accordance with the rate at which the aircraft is ascending or descending.

2. In a device of the character described, the combination of a liquid-containing transparent U-tube one end of which is open to the atmosphere, an atmospheric air container, a pipe connection forming an air passage between the other end of said U-tube and said container, and an air pressure release valve adapted to automatically control the atmospheric air pressure between said U-tube and container.

3. In a device of the character described, the combination of a transparent U-shaped tube containing a liquid and open at one end to the atmosphere, an indicating calibrated scale coöperating with the rise and fall of said liquid in indicating the rate of ascension and descension of an aircraft, at atmospheric air container, a communication between said container and said tube, a compensating valve and an element connected to said valve affected by the atmosphere as the altitudes of the aircraft vary and whereby the valve is actuated to regulate the air pressure from the container to the U-tube under varying elevations.

4. In a device of the character described, the combination of a transparent U-tube containing a liquid adapted to rise and fall under atmospheric pressure, one end of said tube being open to the atmosphere, an atmospheric air container, a pipe forming a communication between said container and the other end of said U-tube, a lateral passage communicating with said pipe, a valve controlling the outlet and inlet of said lateral passage, and an air pressure regulating member secured to said valve whereby the air pressure passing from said container to said U-tube diminishes to the extent necessary to correctly indicate the rate at which the aircraft ascends.

In testimony whereof I affix my signature.
BENSON R. SHAW.